United States Patent
Singh et al.

(10) Patent No.: US 9,906,993 B2
(45) Date of Patent: Feb. 27, 2018

(54) HANDOVER-RELATED MEASUREMENTS AND EVENTS FOR POWER ADAPTATION

(71) Applicant: QUALCOMM Incorporated, San Diego, CA (US)

(72) Inventors: Damanjit Singh, San Diego, CA (US); Yeliz Tokgoz, San Diego, CA (US); Vinay Joseph, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 14/587,855

(22) Filed: Dec. 31, 2014

(65) Prior Publication Data

US 2015/0334607 A1 Nov. 19, 2015

Related U.S. Application Data

(60) Provisional application No. 61/994,808, filed on May 16, 2014.

(51) Int. Cl.
*H04W 36/00* (2009.01)
*H04W 52/02* (2009.01)
(Continued)

(52) U.S. Cl.
CPC ... *H04W 36/0055* (2013.01); *H04W 36/0083* (2013.01); *H04W 52/0206* (2013.01);
(Continued)

(58) Field of Classification Search
CPC ......... H04W 36/0036; H04W 36/0055; H04W 36/0083; H04W 52/04; H04W 52/44;
(Continued)

(56) References Cited

U.S. PATENT DOCUMENTS 8,559,397 B2 10/2013 Huang et al.
2010/0124173 A1 5/2010 Agashe et al.
(Continued)

FOREIGN PATENT DOCUMENTS

EP           2272211 B1    2/2013
EP         2 605 585 A1    6/2013
WO   WO-2013/156067 A1   10/2013

OTHER PUBLICATIONS

Written Opinion of the Preliminary Examining Authority—PCT/US2015/026001—dated Apr. 12, 2016. 11 Total Pages.
(Continued)

*Primary Examiner* — Barry W Taylor
(74) *Attorney, Agent, or Firm* — Arent Fox, LLP

(57) ABSTRACT

The disclosure describes methods and apparatuses for handover-related measurements and events for power adaptation. The disclosure provides for management of an eNodeB for improving reliability of incoming handovers to a cell provided by the eNodeB. At least one handover failure event for an incoming handover to a cell provided by the target eNodeB is detected. The eNodeB or central entity determines that the cell is providing an undesired coverage area based on the at least one handover failure event. In response to determining that the cell is providing an undesired coverage area, the transmit power for the cell may be adjusted to alter the undesired coverage area. A performance measurement based on the at least one handover failure event may be used to evaluate the undesired coverage area. The incoming handover failure events may include incoming too-early handovers, incoming too-late handovers, incoming wrong cell handovers, and incomplete incoming handovers.

24 Claims, 11 Drawing Sheets

(51) Int. Cl.
  *H04W 24/08* (2009.01)
  *H04W 36/30* (2009.01)
  *H04W 52/48* (2009.01)
  *H04W 52/04* (2009.01)
  *H04W 52/44* (2009.01)
  *H04W 24/02* (2009.01)
  *H04W 92/20* (2009.01)

(52) U.S. Cl.
  CPC ............ *H04W 24/02* (2013.01); *H04W 24/08* (2013.01); *H04W 36/30* (2013.01); *H04W 52/04* (2013.01); *H04W 52/44* (2013.01); *H04W 52/48* (2013.01); *H04W 92/20* (2013.01); *Y02B 60/50* (2013.01)

(58) Field of Classification Search
  CPC .. H04W 52/48; H04W 52/0206; H04W 24/08
  See application file for complete search history.

(56) References Cited

U.S. PATENT DOCUMENTS

| | | |
|---|---|---|
| 2010/0173633 A1 | 7/2010 | Catovic et al. |
| 2011/0268085 A1 | 11/2011 | Barany et al. |
| 2013/0045749 A1 | 2/2013 | Sridhar et al. |
| 2013/0109387 A1 | 5/2013 | Tinnakornsrisuphap et al. |
| 2013/0143573 A1 | 6/2013 | Basu Mallick et al. |
| 2013/0165108 A1* | 6/2013 | Xu ........................ H04W 24/04 455/423 |
| 2014/0064247 A1 | 3/2014 | Teyeb et al. |
| 2015/0043386 A1* | 2/2015 | Racz ..................... H04L 41/044 370/255 |
| 2016/0044518 A1* | 2/2016 | Centonza .............. H04W 24/02 370/328 |
| 2016/0337990 A1* | 11/2016 | Mitsui ................. H04W 36/165 |

OTHER PUBLICATIONS

"3rd Generation Partnership Project; Technical Specification Group Radio Access Network; Evolved Universal Terrestrial Radio Access Network (EUTRAN); X2 application protocol (X2AP) (Release 11 )", 3GPP Standard; 3GPP TS 36.423, 3RD Generation Partnership Project (3GPP), Mobile Competence Centre; 650, Route Des Lucioles; F-06921 Sophia-Antipolis Cedex; France, vol. RAN WG3, No. V11.2.0, Sep. 21, 2012 (Sep. 21, 2012), pp. 1-136, XP050649761, [retrieved on Sep. 21, 2012].

International Search Report and Written Opinion—PCT/US2015/026001—ISA/EPO—Jul. 3, 2015. (14 total pages).

3GPP TS 28.628: "3rd Generation Partnership Project; Technical Specification Group Services and System Aspects; Telecommunication management; Self-Organizing Networks (SON) Policy Network Resource Model (NRM) Integration Reference Point (IRP); Information Service (IS)", Version 11.3.0, Release 11, Sep. 2013, pp. 56, Section 4.4 and 4.5.

3GPP TS 36.300: "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", Version 9.7.0, Release 9, Mar. 2011, pp. 175, Section 22.4.2.

* cited by examiner

HANDOVER-RELATED MEASUREMENTS AND EVENTS FOR POWER ADAPTATION

CROSS-REFERENCE TO RELATED APPLICATIONS

This application claims priority to U.S. Provisional Application Ser. No. 61/994,808, filed on May 16, 2014, entitled "HANDOVER-RELATED MEASUREMENTS AND EVENTS FOR POWER ADAPTATION" which is assigned to the assignee hereof and hereby expressly incorporated by reference herein in its entirety.

BACKGROUND

Aspects of the present disclosure relate generally to wireless communication systems, and more particularly, to measurements and events for power adaptation in cell handovers.

Wireless communication networks are widely deployed to provide various communication services such as telephony, video, data, messaging, broadcasts, and so on. Such networks, which are usually multiple access networks, support communications for multiple users by sharing the available network resources.

In a cell handover, a current serving cell of an enhanced Node B (eNodeB) may transfer an active call of a user equipment (UE) to another cell. The first cell may be referred to as a source cell and the second cell may be referred to as a target cell. Similarly, the eNodeB providing the source cell may be referred to as a source eNodeB, and the eNodeB providing the target cell may be referred to as a target eNodeB. A handover failure may occur when, for any reason, the source cell is unable to successfully handover the UE to the target cell.

Self-Organizing Network (SON) policy has attempted to provide autonomy to various network elements to dynamically solve problems in order to provide better service. Mobility robustness optimization (MRO) has attempted to improve mobility performance by allowing detection and correction of connection failures by allowing a source cell/eNodeB that is involved in a handover failure, to dynamically change handover parameters and transmission parameters to improve mobility. MRO, however, has been limited to detecting events and making adjustments at a source eNodeB. Accordingly, current MRO procedures may not remedy problems due to the target eNodeB.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The disclosure describes methods and apparatuses for handover-related measurements and events for power adaptation. The disclosure provides for management of an eNodeB for improving reliability of incoming handovers to a cell provided by the eNodeB. The eNodeB, as a target eNodeB, detects at least one handover failure event for an incoming handover to a cell provided by the target eNodeB. The eNodeB determines that the cell is providing an undesired coverage area based on the at least one handover failure event. In response to determining that the cell is providing an undesired coverage area, the eNodeB adjusts the transmit power for the cell to alter the undesired coverage area. The eNodeB may determine a performance measurement based on the at least one handover failure event. The incoming handover failure events may include incoming too-early handovers, incoming too-late handovers, incoming wrong cell handovers, and incomplete incoming handovers.

In an aspect, the disclosure provides a method of wireless communications. The method may include detecting at least one handover failure event for an incoming handover to a cell provided by a target eNodeB. The method may further include determining that the cell provides an undesired coverage area based on the at least one handover failure event. The method may also include adjusting, in response to the determination that the cell is providing an undesired coverage area, a transmit power of the cell to alter the undesired coverage area. In an aspect, the method may be performed autonomously by the target eNodeB. In another aspect, the method may be performed by a centralized entity managing a plurality of eNodeBs.

In another aspect, the disclosure provides for an apparatus for transmit power adaptation for wireless communications. The apparatus may include means for detecting at least one handover failure event for an incoming handover to a cell provided by a target eNodeB. The apparatus may further include means for determining that the cell provides an undesired coverage area based on the at least one handover failure event. The apparatus may also include means for adjusting, in response to the determination that the cell is providing an undesired coverage area, a transmit power of the cell to alter the undesired coverage area. In an aspect, the apparatus may be the target eNodeB. In another aspect, the apparatus may be a centralized entity managing a plurality of eNodeBs.

The disclosure provides, in another aspect, another apparatus for transmit power adaptation for wireless communications. The apparatus may include a handover event detecting component configured to detect at least one handover failure event for an incoming handover to a cell provided by the target eNodeB. The apparatus may further include a performance analyzer configured to determine that the cell provides an undesired coverage area based on the at least one handover failure event. The apparatus may also include a transmit controller configured to adjust, in response to the determination that the cell is providing an undesired coverage area, a transmit power of the cell to alter the undesired coverage area. In an aspect, the apparatus may be the target eNodeB. In another aspect, the apparatus may be a centralized entity managing a plurality of eNodeBs.

In another aspect, the disclosure provides a computer-readable medium storing computer executable code. The compute-readable medium may include code for detecting at least one handover failure event for an incoming handover to a cell provided by a target eNodeB. The computer-readable medium may further include code for determining that the cell provides an undesired coverage area based on the at least one handover failure event. The computer-readable medium may also include code for adjusting, in response to the determination that the cell is providing an undesired coverage area, a transmit power of the cell to alter the undesired coverage area. The computer-readable medium may be a non-transitory computer-readable medium.

These and other aspects of the disclosure will become more fully understood upon a review of the detailed description, which follows.

DETAILED DESCRIPTION

Figure 1:
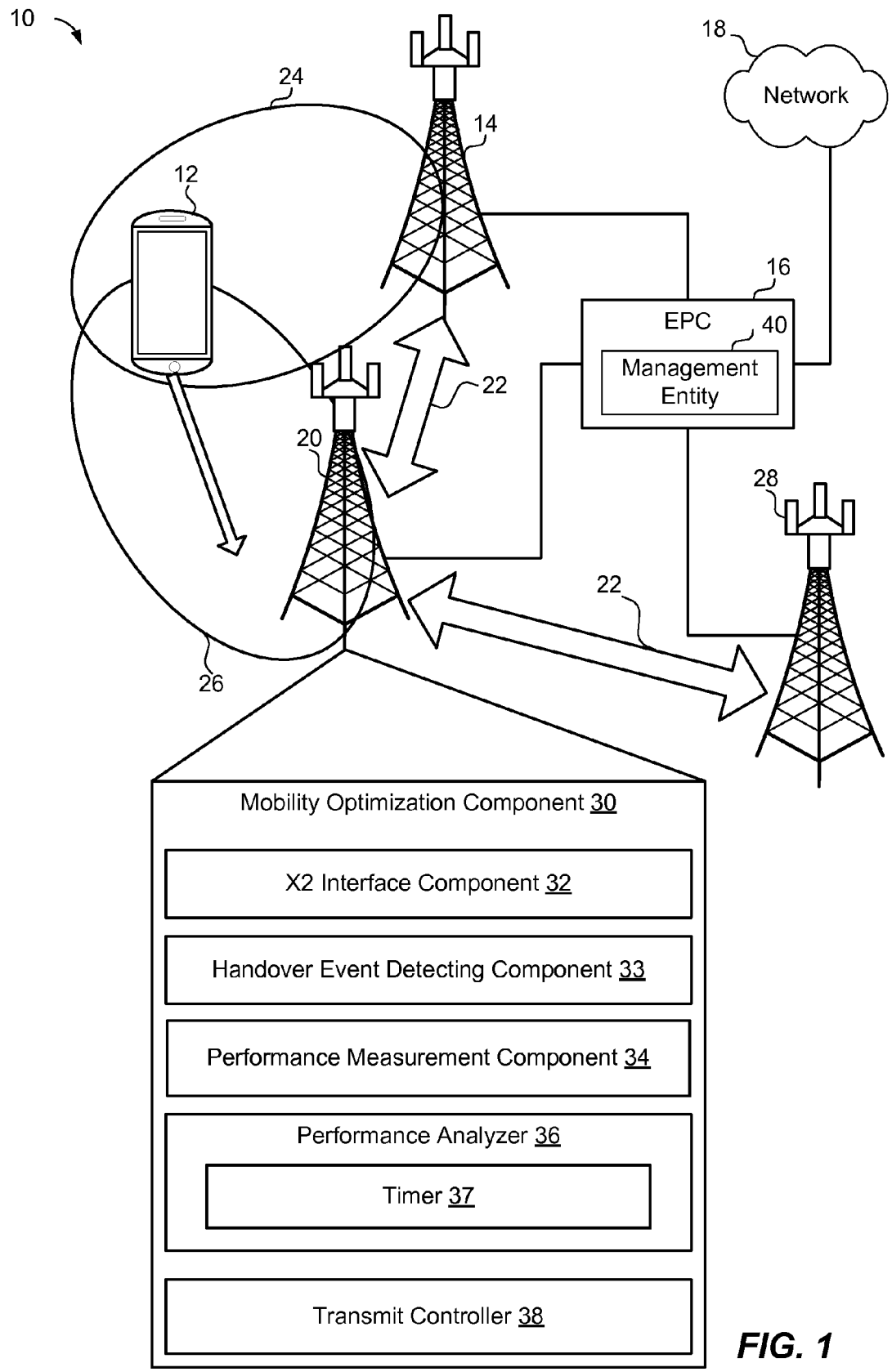
FIG. 1 is a diagram conceptually illustrating a wireless device in communication with a radio network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the UMTS mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

As the demand for mobile broadband access continues to increase, research and development continue to advance the UMTS and LTE technologies not only to meet the growing demand for mobile broadband access, but to advance and enhance the user experience with mobile communications.

Self-Organizing Network (SON) policy has attempted to provide autonomy to various network elements to dynamically solve problems in order to provide better service. Mobility robustness optimization (MRO) has attempted to allow a source nodeB to dynamically change handover parameters and transmission parameters for a cell to improve mobility. For example, 3GPP TS 28.628 v.11.3.0 describes optimization that may be performed by an eNodeB based on performance measurements for outgoing handovers from a cell. Sometimes, however, the eNodeB may experience outgoing handover problems that cannot be easily remedied by itself (i.e., from the source eNodeB actions). In some cases, a target eNodeB may be causing outgoing handover problems for the source eNodeB that may be more readily solved by the target eNodeB actions. In other cases, a cell, other than the source or the target cell, may be causing outgoing handover problems for the source cell that may be more readily solved by the actions of the cell causing the outgoing handover problems. For example, a cell may be providing an undesired coverage area within the coverage area of another cell that leads to handover failures. A cell with an undesired coverage area may be referred to as a leaky cell. The source eNodeB may have no mechanism for requesting a change of transmission characteristics at a target eNodeB. Accordingly, it may be useful for a cell to determine on its own whether it is a leaky cell.

In an aspect, an eNodeB may track performance measurements of handovers when the eNodeB is providing the target cell of a handover. Based on the performance measurements, the eNodeB may determine whether the configuration of the cell is a cause of handover failures from one or more other cells. The eNodeB may adjust transmission properties in order to improve handover reliability. The adjustments by a target eNodeB may be supplemental to optimization by a source cell or source eNodeBs. The eNodeB may provide an opportunity for source cells or eNodeBs to adjust parameters before adjusting transmission properties.

FIG. 1 illustrates several nodes of a sample wireless communications system 10 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs (or eNBs), Home NodeBs, Home eNodeBs, small cells, macro cells, femto cells, and so on, while access terminals may be referred to or implemented as user equipment (UEs), mobile stations, and so on.

The term "small cell," as used herein, refers to a relatively low transmit power and/or a relatively small coverage area cell as compared to a transmit power and/or a coverage area of a macro cell. Further, the term "small cell" may include, but is not limited to, cells such as a femto cell, a pico cell, access point base stations, Home NodeBs, femto access points, or femto cells. For instance, a macro cell may cover a relatively large geographic area, such as, but not limited to, several kilometers in radius. In contrast, a pico cell may cover a relatively small geographic area, such as, but not limited to, a building. Further, a femto cell also may cover a relatively small geographic area, such as, but not limited to, a home, or a floor of a building.

Referring to FIG. 1, in an aspect, the wireless communications system 10 includes at least one UE 12 in communication coverage of at least one eNodeB 14. The wireless communications system 10 may further include additional eNodeBs such as eNodeB 20 and eNodeB 28, with which the UE 12 may also communicate. UE 12 may communicate with a network 18 including an evolved packet core (EPC) 16 via eNodeB 14. An eNodeB may provide a cell having a coverage area. For example, eNodeB 14 may provide a cell having coverage area 24, and eNodeB 20 may provide a cell having coverage area 26. In some aspects, multiple UEs such as UE 12 may be in communication coverage with one or more eNodeBs, including eNodeB 14, eNodeB 20, or eNodeB 28. As the UE 12 moves between coverage area 24 and coverage area 26, for example, the eNodeB 14 (or a cell supported or provided by eNodeB 14) may handover the UE 12 to the eNodeB 20 (or to a cell supported or provided by the eNodeB 20). The eNodeB 14 may be referred to as a source eNodeB, while the eNodeB 20 may be referred to as a target eNodeB for such a handover. It should be apparent that an eNodeB may operate as either a source eNodeB or a target eNodeB depending on the movement of the UE 12 and direction of the handover. It should also be appreciated that an eNodeB may also be referred to as a cell provided by the eNodeB. A cell ID may be mapped to an eNodeB. The eNodeB 14, eNodeB 20, and/or eNodeB 28 may communicate via an X2 interface 22 or some other similar interface.

The eNodeB 20 may include a mobility optimization component 30 configured to optimize transmission properties of the eNodeB 20 to improve handover reliability to a cell of the eNodeB 20. The mobility optimization component 30 may be implemented by hardware, firmware, and/or a processor executing software configured to provide target side MRO. The mobility optimization component 30 may include an X2 interface component 32, a handover event detecting component 33, a performance measurement component 34, a performance analyzer 36, and a transmit controller 38.

The X2 interface component 32 may be configured to send, receive, and/or analyze messages sent via an X2 interface 22. The X2 interface component 32 may include a network interface (not shown) for sending and receiving messages. The X2 interface component 32 may also include hardware, firmware, and/or a processor executing software configured to format and analyze messages. The X2 interface 22 may be used to transmit messages indicating problems or conditions associated with handovers. In particular the X2 interface component 32 may send or receive an RLF INDICATION message to another eNodeB, where RLF refers to a radio link failure. The RLF INDICATION message may be generated when a UE 12 attempts to re-establish a radio link connection at the eNodeB 20. The eNodeB 20 may receive a connection reestablishment message including RLF information from the UE 12. The RLF INDICATION message may include a failure cell ID indicating an identifier of the cell to which the UE 12 was connected prior to the failure (e.g. a physical cell identity (PCI) of eNodeB 14), a reestablishment cell ID indicating an identifier of the cell where the radio link establishment is made (e.g. a e-UTRAN Cell Global Identifier (ECGI) of eNodeB 20), a cell radio network temporary identifier (C-RNTI) of the UE 12 in the cell to which the UE was connected prior to the failure, and a an optional shortMAC-I for security configuration.

The X2 interface component 32 may also send or receive a HANDOVER REPORT message. The HANDOVER REPORT message may include a type of detected handover problem or condition, ECGI of the source and target cells in the handover, an ECGI of the re-establishment cell, and a handover cause that was signaled by the source during handover preparation. The detected handover problem or condition may include one of: a too-late handover, a too-early handover, and a handover to wrong cell. The type of handover problem may be determined, for example, as described in 3GPP TS 36.300 v. 9.7.0 §22.4.2.

The handover event detecting component 33 may be configured to detect handover events where the eNodeB 20 is a target eNodeB or a wrong eNodeB/cell. The handover event detecting component 33 may include hardware, firmware, and/or a processor executing software configured to detect handover events. For example, the handover event detecting component 33 may include a processor configured to analyze messages received from the UE 12 and from other eNodeBs over the X2 interface component 32. In an aspect, the handover event detecting component 33 may detect incoming too-late handovers, incoming too-early handovers, incoming wrong-cell handovers, and incomplete handovers in addition to outgoing handover events.

The handover event detecting component 33 may detect when the target eNodeB 20 is a target of an incoming too-late handover. In particular, the handover event detecting component 33 may detect when X2 interface component 32 sends an RLF INDICATION message to, for example, eNodeB 14, indicating that a UE 12 has reestablished a connection in coverage area 26 using eNodeB 20 and the ECGI of the target cell matches the ECGI of eNodeB 20. The handover event detecting component 33 may record an incoming too-late handover for the target eNodeB 20. In an aspect, the eNodeB 14 may receive the RLF INDICATION message and determine that an outgoing too-late handover occurred.

The handover event detecting component 33 may also detect that the target eNodeB 20 is a target of an incoming too-early handover. In particular, the handover event detecting component 33 may detect an incoming too-early handover when the X2 interface component 32 receives an RLF INDICATION message from, for example, eNodeB 14 indicating that a UE 12 has reestablished a connection in cell coverage area 24 using eNodeB 14 after handing over to eNodeB 20 from eNodeB 14. In an aspect, the eNodeB 20 may determine that eNodeB 20 is a target of an incoming too-early handover when X2 interface component 32 sends a HANDOVER REPORT message to eNodeB 14, on receiving an RLF INDICATION message, to indicate that a too-early handover occurred. The handover event detecting component 33 may record an incoming too-early handover event for the target eNodeB 20. In an aspect, the eNodeB 14 may receive the HANDOVER REPORT message and determine that an outgoing too-early handover occurred.

The handover event detecting component 33 may also detect that the target eNodeB 20 is a target of an incoming handover to wrong cell. In particular, the handover event detecting component 33 may detect an incoming wrong cell handover when the X2 interface component 32 receives an RLF INDICATION message from, for example, a third eNodeB 28 that is not the source eNodeB 14 or the target eNodeB 20, indicating that a UE 12 has reestablished a connection to a cell provided by the eNodeB 28 after handing over to eNodeB 20 from eNodeB 14. In an aspect, the eNodeB 20 may determine that eNodeB 20 is a target of an incoming wrong cell handover when X2 interface component 32 sends a HANDOVER REPORT message to eNodeB 14, on receiving an RLF INDICATION message from eNodeB 28, to indicate that a wrong cell handover occurred. The handover event detecting component 33 may record an incoming wrong-cell handover event for the target eNodeB 20. In an aspect, the eNodeB 14 may receive the HANDOVER REPORT message and determine that an outgoing wrong-cell handover occurred.

The handover event detecting component 33 may also detect or identify handover failure events where the eNodeB 20 was prepared for a handover but did not connect with the UE 12. For example, the eNodeB 20 may receive a HANDOVER REQUEST message from a source eNodeB 14, but the UE 12 may not complete a connection to the eNodeB 20. The handover preparation may be cancelled by a subsequent message or may be cleared due to expiration of a timer. For example, the eNodeB 20 may receive a HANDOVER CANCEL message from the eNodeB 14 on the X2 interface 22. The handover event detecting component 33 may record an incomplete handover event when the HANDOVER CANCEL message is received or the timer expires.

The performance measurement component 34 may be configured to determine a performance measurement for at least one handover failure event at a target eNodeB 20. The performance measurement component 34 may be implemented by hardware, firmware, and/or a processor executing software configured to determine performance measurements for at least one handover failure event. The performance measurement component 34 may be configured to measure failure events detected by the X2 interface component 32. In particular the performance measurement component 34 may be configured to measure a number and timing of: too-early handover messages sent, wrong cell handover messages sent, too-late handovers detected, and incomplete handover events. The performance measurements may be tracked for each related cell separately. The performance measurement component 34 may also be configured to measure a number and timing of: successful incoming handover events and total incoming handover failure events.

The performance analyzer 36 may be configured to determine whether the target eNodeB 20 is providing an undesired coverage area based on the performance measurement. The performance analyzer 36 may be implemented by hardware, firmware, and/or a processor executing software configured to analyze one or more performance measurements. An undesired coverage area may be a coverage area of the target eNodeB 20 within a cell of another eNodeB. For example, an undesired coverage area may refer to a cell's coverage area that may be leaking, extending, or otherwise extending into an area or region covered by another cell or cells. The performance analyzer 36 may determine that the target eNodeB 20 is providing an undesired coverage area when a performance measurement for incoming failed handovers exceeds a threshold value. The threshold value may be configured as a number of handover failures or a percentage of a handovers resulting in failures.

In an aspect, the performance analyzer 36 may be configured to use a combination of both incoming handover performance measurements and outgoing handover performance measurements. For example, the performance analyzer 36 may compare a number of incoming too-late handovers to a number of outgoing too-late handovers. In another example, the performance analyzer 36 may use a metric based on the summation of number of incoming too-late handovers and number of outgoing too-late handovers.

In an aspect, the performance analyzer 36 may be further configured to provide an opportunity for another eNodeB to change configuration before adjusting the transmit power of the target eNodeB 20. For example, a source eNodeB 14 may resolve the problem through configuration changes by performing one or more of the following: 1) adapting the transmit power of the source eNodeB; 2) adapting resource block allocation including those to users experiencing high path loss to the cells provided by the eNodeB; 3) adapting resource block allocation including those to users experiencing high interference from cells provided by other eNodeBs; and/or 4) using MRO to adjust handover parameters such as time-to-trigger, hysteresis, offsets, filtering coefficients.

The performance analyzer 36 may provide an opportunity for such actions by delaying any changes by the target eNodeB 20 after detecting an undesired coverage area. For example, the performance analyzer 36 may require additional handover failure events to be detected, or may require the performance measurement to persist in exceeding the threshold for a configured time period. In an aspect, the performance analyzer 36 may include a timer 37 for measuring the configured time period. The performance analyzer 36 may also put time constraints on action by the target eNodeB 20. For example, the performance analyzer 36 may allow transmit power changes only on a recurring or periodic basis (e.g. once per day) or may require a minimum time between transmit changes at the target eNodeB 20. The timer 37 may measure the periodic basis or the minimum time. The performance analyzer 36 may repeat the analysis of the performance measurements after the timer 37 has expired to determine whether a source eNodeB 14 has resolved the detected problem.

The transmit controller 38 may be configured to adjust the transmit power of all cells provided by the eNodeB 20 in response to determining that any of the cells is providing an undesired coverage area. The transmit controller 38 may either increase or decrease the transmit power (e.g., the power applied for transmitting signals over a wireless medium) based on the performance measurements. For example, the transmit controller 38 may increase the transmit power of a cell when a high rate of incoming too-late handovers is detected in order to provide a larger overlapping coverage area. As another example, the transmit controller 38 may decrease the transmit power of a cell when a high rate of incoming too-early handovers is detected in order to allow handovers to other possible cells. As another example, the transmit controller 38 may reduce the transmit power when a high rate of incoming handovers to the wrong cell (i.e. undesirable incoming handovers to the target eNodeB 20) is detected. These decisions by the transmit controller 38 could be further conditioned on several factors associated with the cells such as resource utilization, number of users being served by the cell, current transmit power, feasible transmit power choices, backhaul quality, interference measurements etc. In an aspect, the transmit controller 38 may be further configured to provide adjustment of a transmit antenna. For example, the transmit controller 38 may change the antenna tilt or antenna azimuth to change the coverage area of the eNodeB 20.

In an aspect, the system 10 may further include a management entity 40 that may also include a mobility optimization component 30. For example, the management entity 40 may be a node in the EPC 16 such as a mobility management entity. The management entity 40 may optimize transmission properties of one or more eNodeBs 14, 20, 28 to improve handover reliability to respective cells of the eNodeBs. In an aspect, the management entity 40 may observe communications on the X2 interfaces 22, or otherwise receive handover event information. Accordingly, the mobility optimization component 30 at the management entity 40 may detect handover events for a plurality of eNodeBs. The mobility optimization component 30 at the management entity 40 may also determine that one or more cells provide an undesired coverage area based on the handover failure events and adjusting a transmit power of one or more cells to alter undesired coverage areas.

Figure 2:
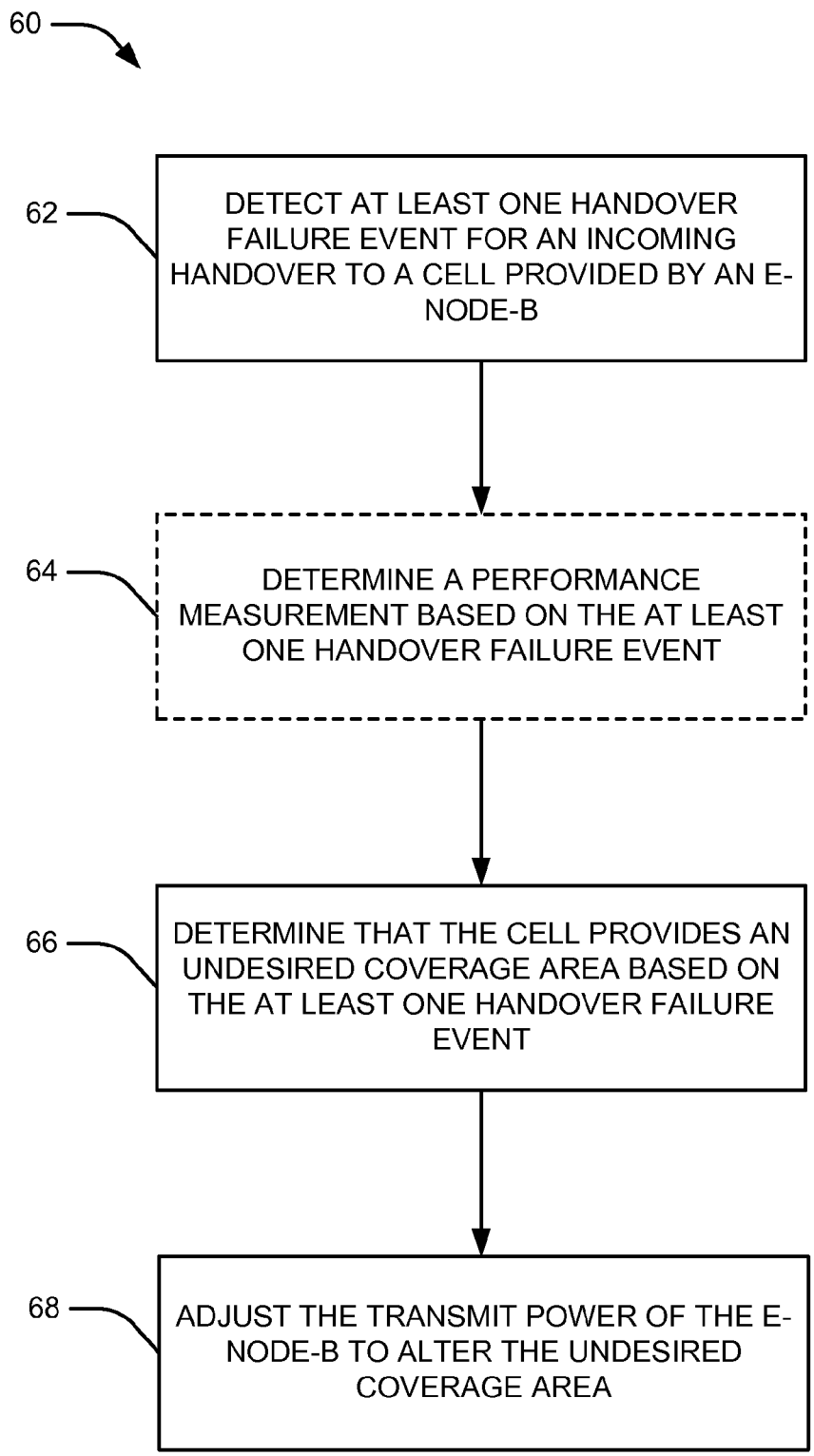
FIG. 2 is a flowchart illustrating an example of a method of controlling an eNodeB.

Referring to FIG. 2, in an operational aspect, a target eNodeB such as eNodeB 20 (FIG. 1) may perform an aspect of a method 60 of wireless communication. In another operational aspect, a centralized entity such as the management entity 40 (FIG. 1) may perform an aspect of the method 60 of wireless communication. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 62, the method 60 may include detecting a handover failure event for an incoming handover. The handover event detecting component 33 (FIG. 1) may detect a handover failure event for an incoming handover. In one aspect, the detection by the handover event detecting component 33 may further involve sending an indication that a handover occurred too-early using the X2 interface component 32. In another aspect, the detection by the handover event detecting component 33 may further involve sending an indication that a handover to the eNodeB was a handover to a wrong cell using the X2 interface component 32. In yet another aspect, the detection by the handover event detecting component 33 may further involve detecting the at least one handover failure event by determining that the target eNodeB (e.g. the eNodeB 20 in FIG. 1) was prepared for a handover and the handover was not completed. In yet another aspect, the detection by handover event detecting component 33 may further involve sending a radio link failure indication to a source eNodeB (e.g. the eNodeB 14 in FIG. 1) using the X2 interface component 32 when the radio link failure indication is due to a too-late handover to the cell.

At block 64, the method 60 may optionally include determining, at a target eNodeB, a performance measurement of the at least one handover failure event. The performance measurement component 34 (FIG. 1) may determine the performance measurement of the at least one handover failure event. The performance measurement may include a statistic or statistical information based on one or more detected handover failure events. For example, the performance measurement may be a number, a rate, or a percentage associated with a particular type of handover failure event. Performance measurements may be determined separately for each related eNodeB. For example, the target eNodeB may determine a rate of incoming too-late handovers from each eNodeB (e.g. eNodeB 14 and eNodeB 28) that has handed a UE over to the target eNodeB 20.

At block 66, the method 60 may include determining that the cell provides an undesired coverage area based on the at least one handover failure event. The performance analyzer 36 (FIG. 1) may determine that the cell provides the undesired coverage area based on the handover failure event performance measurement. The performance analyzer 36 may also determine that the cell provides an undesired coverage area based on whether the performance measurement exceeds a threshold for the performance measurement.

At block 68, the method 60 may include adjusting the transmit power of the cell such that the undesired coverage area is altered. The transmit controller 38 (FIG. 1) may adjust the transmit power of the cell such that the undesired coverage area is altered. The transmit controller 38 may increase or decrease the transmit power of the cell to alter the coverage area.

Figure 3C:
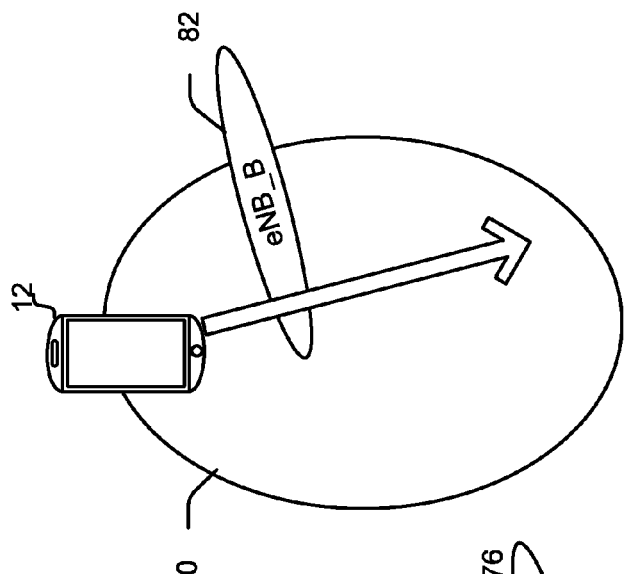
FIGS. 3A-3C illustrate various scenarios for handover failure events.
Figure 3B:
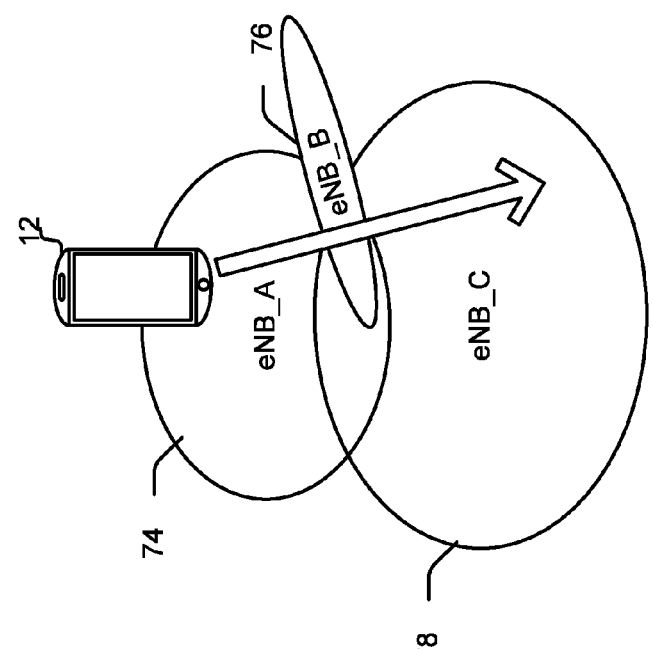
Figure 3A:
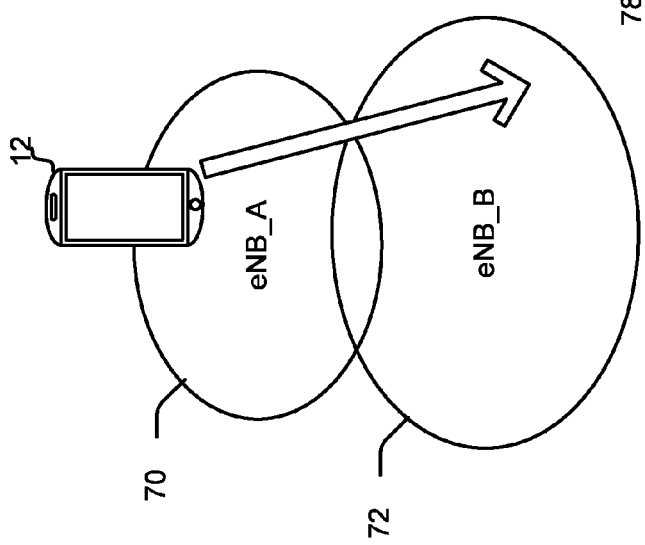

FIG. 3A illustrates an example of a scenario of a handover being too-late. The eNB_A (e.g. eNodeB 14 (FIG. 1)), or a cell associated with the eNB_A, having a coverage area 70 may handover the UE 12 to eNB_B (e.g. eNodeB 20), or a cell associated with eNB_B having a coverage area 72. Accordingly, the eNB_B may be the target eNodeB. However, the UE 12 may not receive a handover command before it leaves the coverage area 70 of eNB_A. The eNB_B may receive a re-establishment request from the UE 12 and send an RLF INDICATION message to eNB_A indicating the handover failure. If eNB_B does not receive a HANDOVER REPORT message from eNB_A, eNB_B may determine that eNB_B was the target of a too-late handover event. In an aspect, the too-late handover may be due, in part, to the eNB_B providing an undesired coverage area. For example, the coverage area 72 of eNB_B may provide insufficient overlap with the coverage area 70 of eNB_A.

FIG. 3B illustrates an example of a scenario of a handover being to the wrong cell. The eNB_A, or a cell associated with the eNB_A, having coverage area 74, may handover the UE 12 to eNB_B, or a cell associated with the eNB_B, having coverage area 76. Accordingly, the eNB_B may be the target eNodeB. The UE 12 may detect a radio link failure and attempt to re-establish its connection with eNB_C having a coverage area 78. The eNB_B may receive an RLF INDICATION message from eNB_C and determine that eNB_B was the wrong cell because of the recent handover. The eNB_B may send a HANDOVER REPORT message to eNB_A indicating a handover to the wrong-cell. The eNB_B may detect a wrong-cell handover failure event where eNB_B was the wrong cell for the handover initiated by eNB_A. In an aspect, the wrong-cell handover may be due, in part, to the eNB_B providing an undesired coverage area. For example, the coverage area 76 of eNB_B may leak into the overlapping coverage areas 74, 78 of eNB_A and eNB_C.

FIG. 3C illustrates an example of a scenario for a handover being too-early. The eNB_A, or a cell associated with the eNB_A, having coverage area 80 may handover the UE 12 to eNB_B, or a cell associated with the eNB_B, having a coverage area 82. Accordingly, the eNB_B may be the target eNodeB. The UE 12 may detect a radio link failure and attempt a re-establishment with eNB_A. The eNB_A may then send an RLF INDICATION message to eNB_B. The eNB_B may receive the RLF INDICATION message from eNB_A and determine that the handover was too-early because the UE 12 came recently from eNB_A and performed re-establishment at eNB_A. The eNB_B may send a HANDOVER REPORT message to eNB_A indicating a too-early handover. The eNB_B may detect a too-early handover failure event where the eNB_B was the target of the too-early handover. In an aspect, the too-early handover may be due, in part, to the eNB_B providing an undesired coverage area. For example, the coverage area 82 of eNB_B may leak into the coverage area 80 of eNB_A.

Figure 4A:
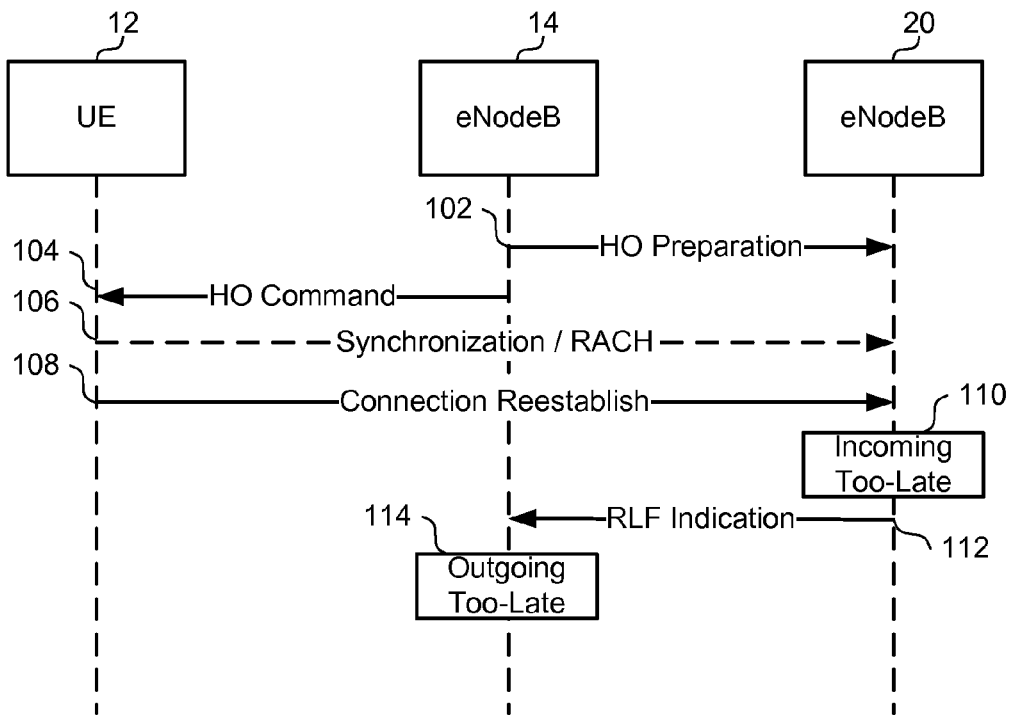
FIGS. 4A-4D illustrate messages in various scenarios for handover failure events.

FIG. 4A illustrates a message diagram for a too-late handover scenario. For simplicity, some messages such as acknowledgement messages may be omitted. The source eNodeB 14 may send a handover (HO) preparation message 102 to the target eNodeB 20. The source eNodeB 14 may also send a handover (HO) command message 104 to the UE 12. The UE 12 may attempt a synchronization and/or random access (RACH) procedure 106 with the target eNodeB 20. The handover, however, may fail before the UE 12 completes the handover to the eNodeB 20. This may occur for several reasons. For example, the radio link between the UE 12 and the source eNodeB 14 may deteriorate such that the handover command is not sent by the source eNodeB 14 due to delay in determining the need for a handover. As another example, the target eNodeB 20 may not receive the handover command. As yet another example, the synchronization/RACH procedure 106 may fails or too many packets may be lost before a connection with the target eNodeB 20 is established. The UE 12, upon detecting a radio link failure, may reestablish a connection with the eNodeB 20 and indicate an RLF in the connection reestablishment message 108. The eNodeB 20 may determine that an incoming too late handover occurred by analyzing the reestablishment message. Accordingly, the eNodeB 20 may detect an incoming too-late handover failure event 110. The eNodeB 20 may then send an RLF indication 112 to the eNodeB 14 indicating the incoming too-late handover failure event 110. The eNodeB 14 may detect an outgoing too-late handover failure event 114.

Figure 4B:
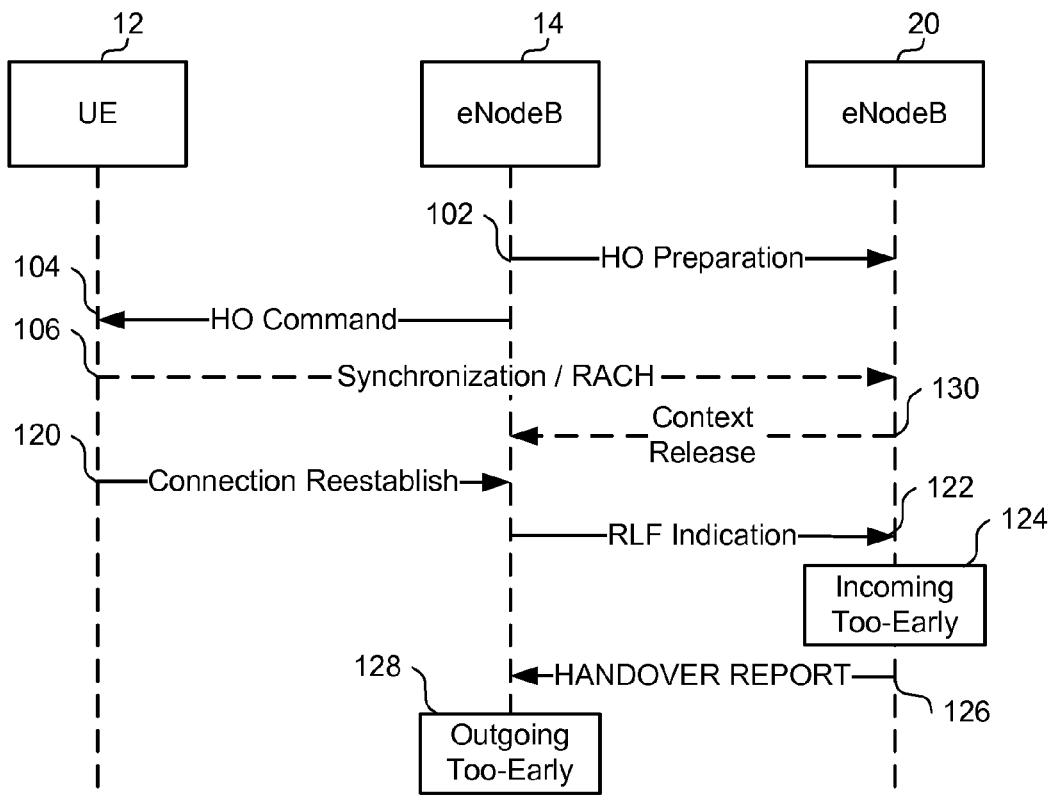

FIG. 4B illustrates a message diagram for a too-early handover scenario. For simplicity, some messages such as acknowledgement messages may be omitted. The HO preparation message 102, HO command message 104, and synchronization/RACH procedure 106 may be similar to FIG. 4A. In a too early handover, the handover, may fail before the UE 12 completes the handover to the eNodeB 20. For example, the UE 12 may be unable to synchronize or complete the synchronization/RACH procedure 106 with the eNodeB 20. Additionally, in a too-early handover, the UE 12 may successfully handover to the eNodeB 20. The synchronization/RACH procedure 106 may be completed and the target eNodeB 20 may send a context release message 130 to the source eNodeB 14. However, the radio link between the UE 12 and the eNodeB 20 may fail shortly after the successful handover. The UE 12, upon detecting a radio link failure, may reestablish a connection with the eNodeB 14 and indicate an RLF in the connection reestablishment message 120. The eNodeB 14 may send an RLF indication to the eNodeB 20. The eNodeB 20 may determine that a too-early handover occurred and detect an incoming too-early handover event 124 because the RLF indication is received from the source eNodeB 14. The eNodeB 20 may send a HANDOVER REPORT message 126 indicating a too-early handover. The eNodeB 14 may detect an outgoing too-early handover event 128 based on the HANDOVER REPORT.

Figure 4C:
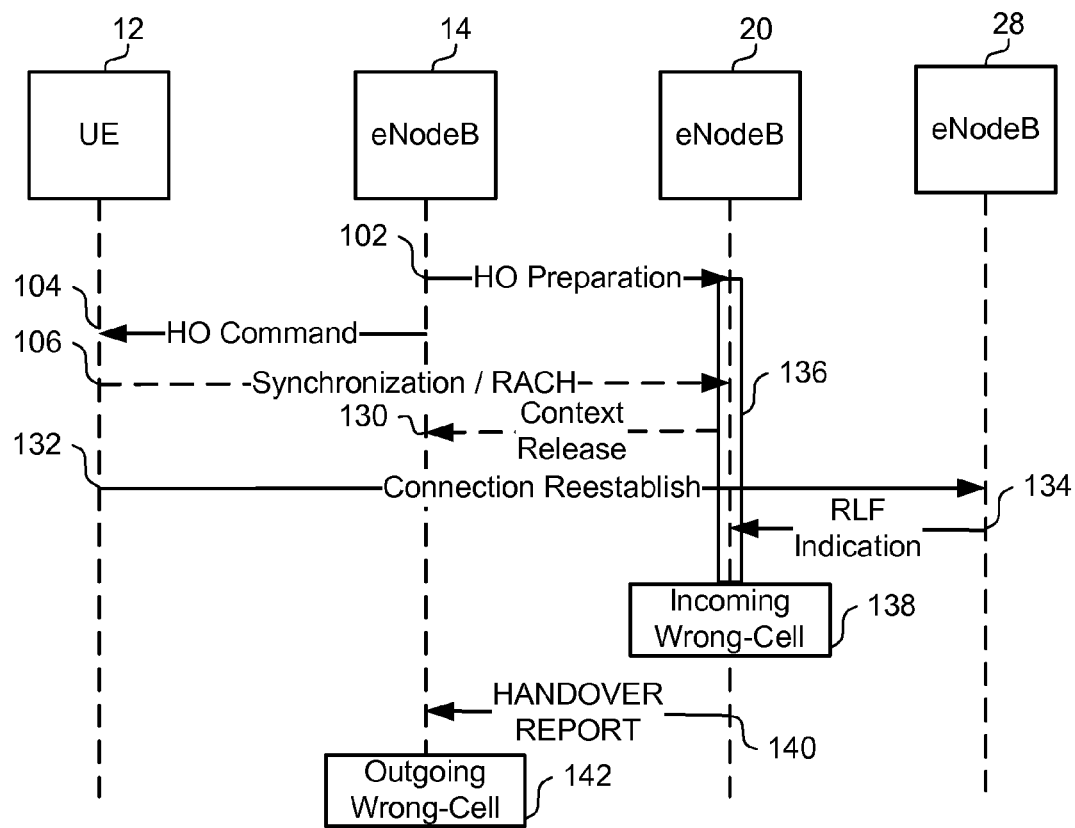

FIG. 4C illustrates a message diagram for a wrong-cell handover scenario. For simplicity, some messages such as acknowledgement messages may be omitted. The HO preparation message 102, HO command message 104, and synchronization/RACH procedure 106 may be similar to FIG. 4A. In a wrong cell handover, the handover may fail before the UE 12 completes the handover to the eNodeB 20. For example, the UE 12 may be unable to synchronize or complete the synchronization/RACH procedure 106 with the eNodeB 20. In a wrong-cell handover, the UE 12 may successfully handover to the eNodeB 20. The synchronization/RACH procedure 106 may be completed and the target eNodeB 20 may send a context release message 130 to the source eNodeB 14. However, the radio link between the UE 12 and the eNodeB 20 may fail shortly after the successful handover. The UE 12, upon detecting a radio link failure, may reestablish a connection with the eNodeB 28 and indicate an RLF in the reestablish message 132. The eNodeB 28 may determine that the handover was to a wrong cell because the eNodeB 28 was neither the source eNodeB nor target eNodeB of the handover. The eNodeB 28 may send a RLF indication 134 to the target eNodeB 20. The target eNodeB 20 may determine that this was an incoming wrong cell handover based on the RLF indication 134 from the third eNodeB 28. In an aspect, the eNodeB 20 may also check to determine that the eNodeB 20 is expecting a handover of the UE 12 or recently completed a handover of the UE 12. For example, the eNodeB 20 may check a timer 136, which may measure the time from the start of the handover or from the context release message 130 to determine whether the eNodeB 20 recently completed a handover of the UE 12. The target eNodeB 20 may detect an incoming wrong-cell handover failure event 138 based on the RLF indication 134 and an unexpired timer 136. The target eNodeB 20 may send a HANDOVER REPORT message 140 indicating the wrong-cell handover failure event. The source eNodeB 14 may detect an outgoing wrong-cell handover failure event 142 based on the HANDOVER REPORT message 140.

Figure 4D:
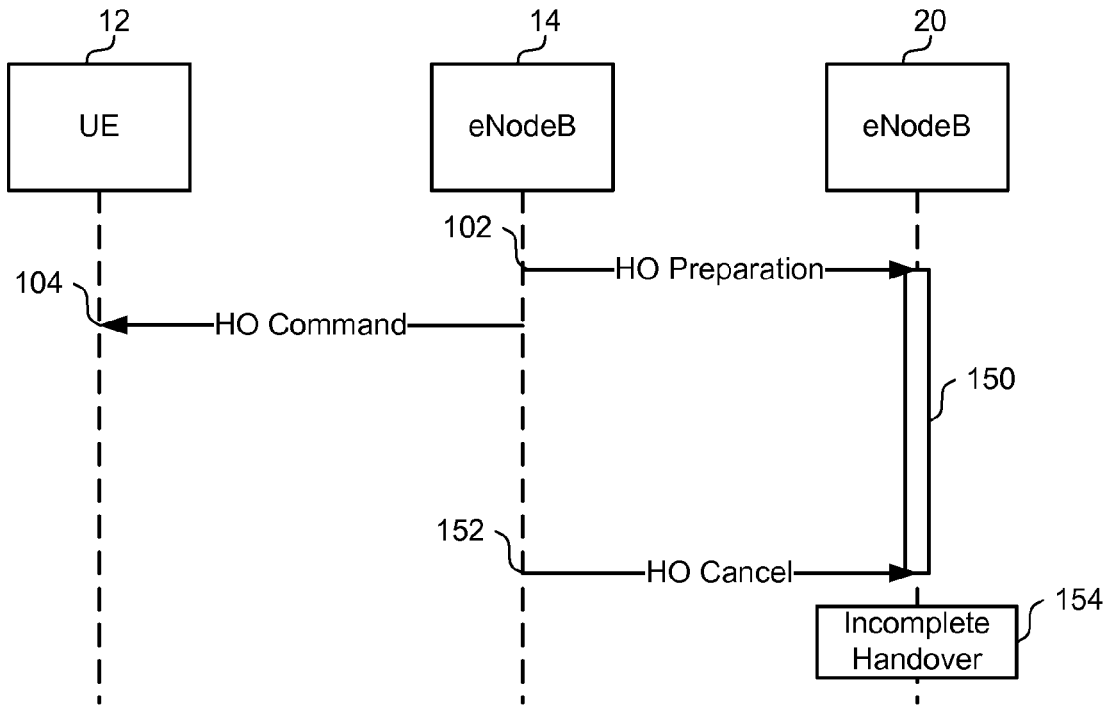

FIG. 4D illustrates a message diagram for an incomplete handover scenario. For simplicity, some messages such as acknowledgement messages may be omitted. The HO preparation message 102 and HO command message 104 may be similar to FIG. 4A. The eNodeB 20, however, may not receive any further communications related to the handover. For example, a timer 150 may expire before any further messages are received at the eNodeB 20. Alternatively, the eNodeB 20 may receive a handover (HO) cancel message 152 from the eNodeB 14. In either case, the eNodeB 20 may detect an incomplete handover event 154.

Figure 5:
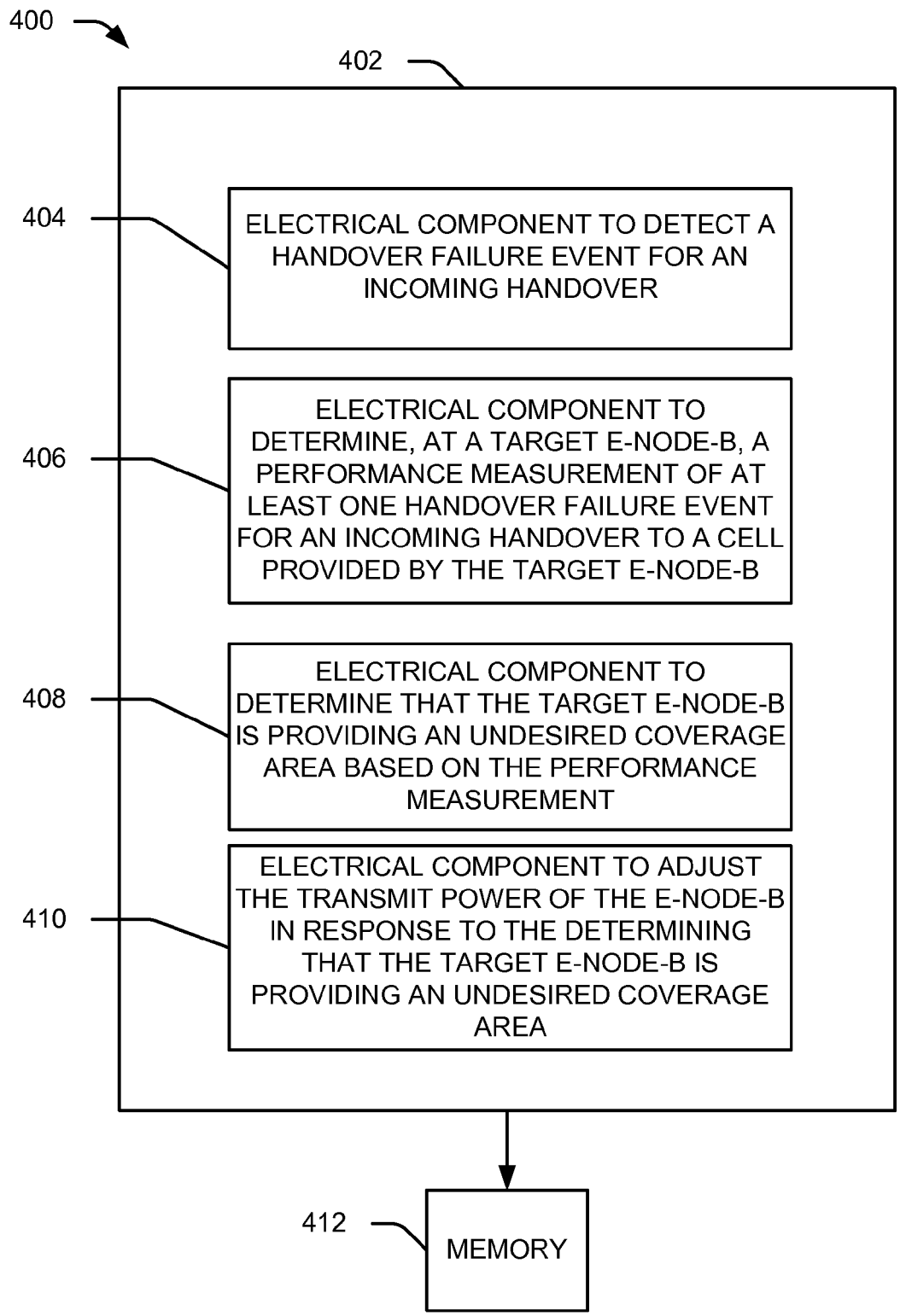
FIG. 5 is a block diagram illustrating aspects of a logical grouping of electrical components as contemplated by the present disclosure.

Referring to FIG. 5, an example system 400 is displayed for optimizing transmission properties of an eNodeB based on handover failure events detected when the eNodeB is the target of the handover. For example, system 400 can reside at least partially within the eNodeB 20 (FIG. 1). It is to be appreciated that system 400 is represented as including functional blocks, which can be functional blocks that represent functions implemented by a processor, software, or combination thereof (for example, firmware). System 400 includes a logical grouping 402 of electrical components that can act in conjunction. For instance, logical grouping 402 can include an electrical component 404 for detecting a handover failure event for an incoming handover. In an aspect, electrical component 404 may comprise a handover event detecting component 33 (FIG. 1) and/or an X2 interface component 32 (FIG. 1).

Additionally, logical grouping 402 can include an electrical component 406 for determining a performance measurement of at least one handover failure event. In an aspect, the electrical component 406 may comprise performance measurement component 34 (FIG. 1).

Additionally, logical grouping 402 can include an electrical component 408 for determining that the target eNodeB is providing an undesired coverage area. In an aspect, the electrical component 408 may comprise performance analyzer 36 (FIG. 1).

Additionally, logical grouping 402 can include an electrical component 410 for adjusting the transmit power of the eNodeB. In an aspect, the electrical component 410 may comprise transmit controller 38 (FIG. 1).

Additionally, system 400 can include a memory 412 that retains instructions for executing functions associated with the electrical components 404, 406, 408, and 410 stores data used or obtained by the electrical components 404, 406, 408, and 410. While shown as being external to memory 412, it is to be understood that one or more of the electrical components 404, 406, 408, and 410 can exist within memory 412. In one example, electrical components 404, 406, 408, and 410 can comprise at least one processor, or each electrical component 404, 406, 408, and 410 can be a corresponding module of at least one processor. Moreover, in an additional or alternative example, electrical components 404, 406, 408, and 410 can be a computer program product including a computer readable medium, where each electrical component 404, 406, 408, and 410 can be corresponding code.

Figure 6:
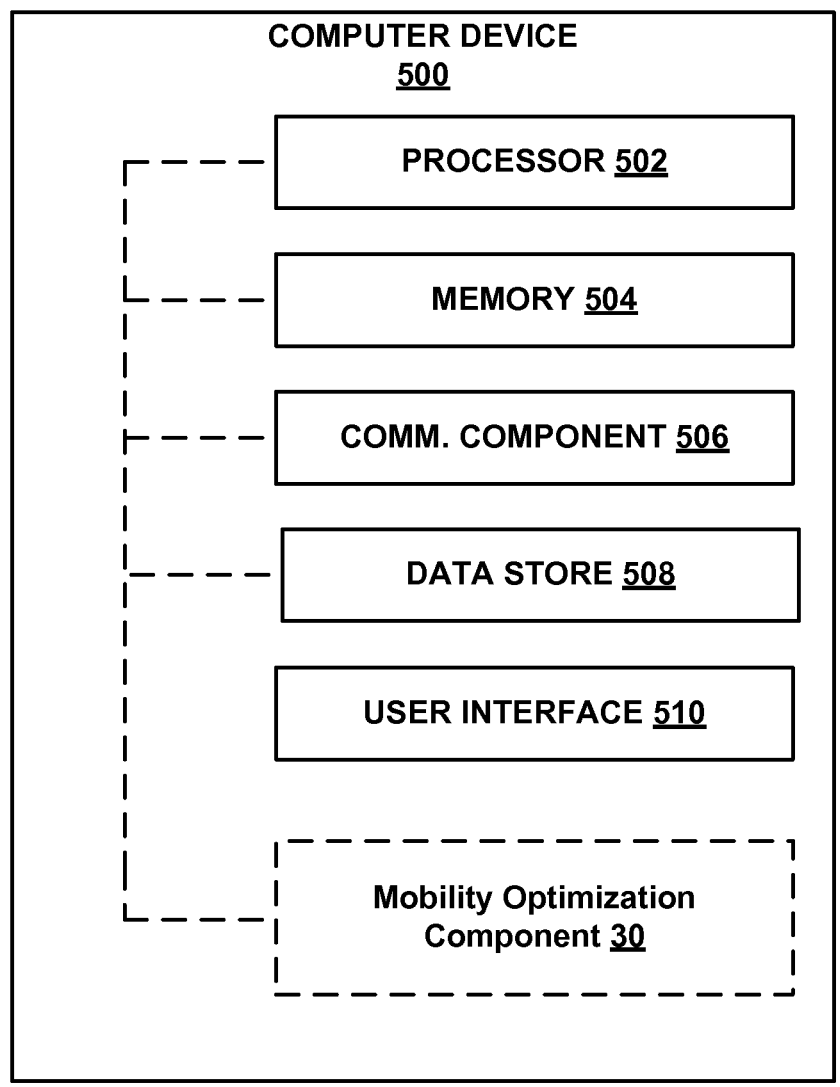
FIG. 6 is a block diagram illustrating aspects of a computer device according to the present disclosure.

Referring to FIG. 6, in one aspect, one or more of eNodeBs 14, 20 (FIG. 1) including mobility optimization component 30 (FIG. 1) may be represented by a specially programmed or configured computer device 500. In one aspect of implementation, computer device 500 may include mobility optimization component 30 (FIG. 1), such as in specially programmed computer readable instructions or code, firmware, hardware, or some combination thereof. Computer device 500 includes a processor 502 for carrying out processing functions associated with one or more of components and functions described herein. Processor 502 can include a single or multiple set of processors or multi-core processors. Moreover, processor 502 can be implemented as an integrated processing system and/or a distributed processing system.

Computer device 500 further includes a memory 504, such as for storing data used herein and/or local versions of applications being executed by processor 502. Memory 504 can include any type of memory usable by a computer, such as random access memory (RAM), read only memory (ROM), tapes, magnetic discs, optical discs, volatile memory, non-volatile memory, and any combination thereof.

Further, computer device 500 includes a communications component 506 that provides for establishing and maintaining communications with one or more parties utilizing hardware, software, and services as described herein. Communications component 506 may carry communications between components on computer device 500, as well as between computer device 500 and external devices, such as devices located across a communications network and/or devices serially or locally connected to computer device 500. For example, communications component 506 may include one or more buses, and may further include transmit chain components and receive chain components associated with a transmitter and receiver, respectively, or a transceiver, operable for interfacing with external devices. In an additional aspect, communications component 506 may be configured to receive one or more pages from one or more subscriber networks. In a further aspect, such a page may correspond to the second subscription and may be received via the first technology type communication services.

Additionally, computer device 500 may further include a data store 508, which can be any suitable combination of hardware and/or software, that provides for mass storage of information, databases, and programs employed in connection with aspects described herein. For example, data store 508 may be a data repository for applications not currently being executed by processor 502 and/or any threshold values or finger position values.

Computer device 500 may additionally include a user interface component 510 operable to receive inputs from a user of computer device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Figure 7:
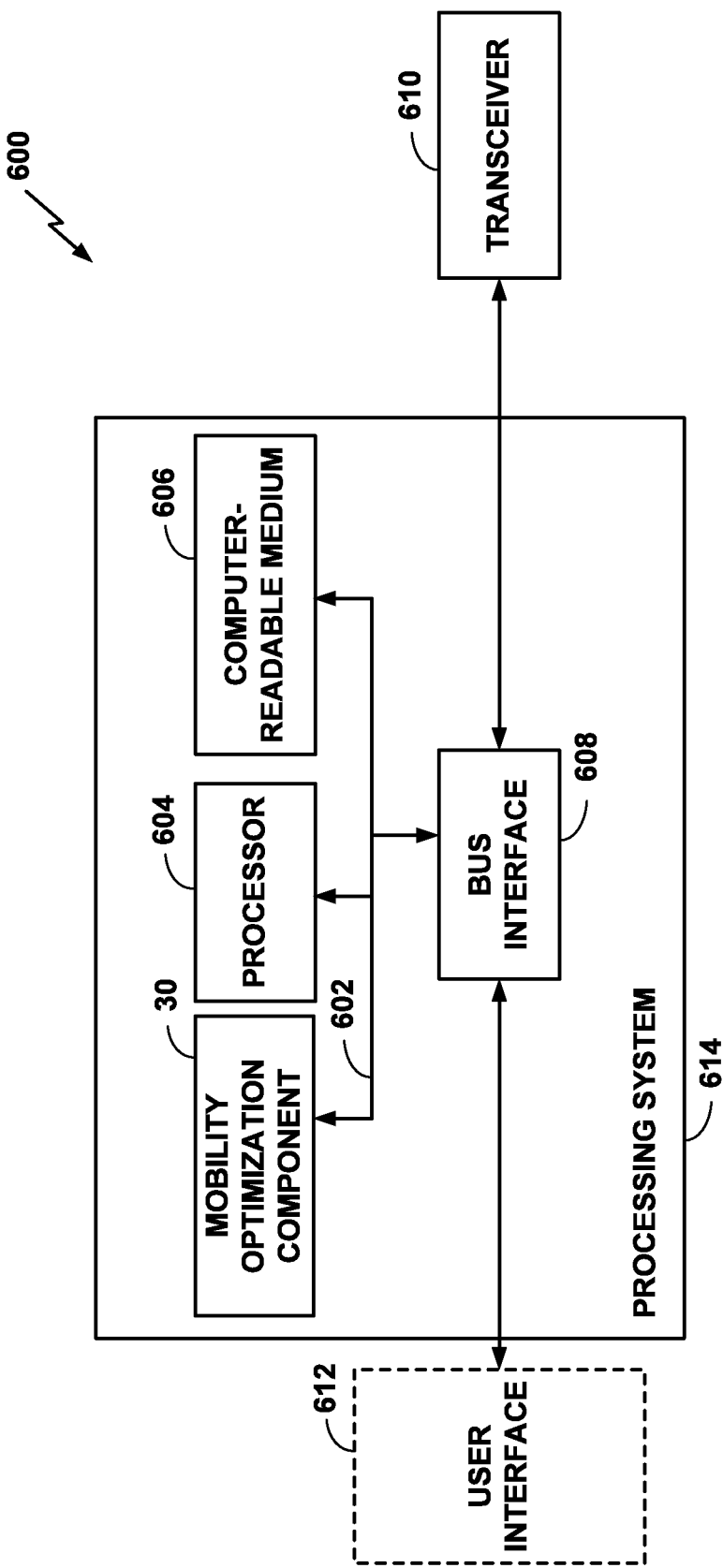
FIG. 7 is a block diagram illustrating an example of a hardware implementation for an apparatus employing a processing system.

FIG. 7 is a block diagram illustrating an example of a hardware implementation for an apparatus 600, for example, including mobility optimization component 30 of FIG. 1 and employing a processing system 614 for carrying out aspects of the present disclosure, such as method for optimizing coverage area of an eNodeB based on failure events for handover to the eNodeB. In this example, the processing system 614 may be implemented with bus architecture, represented generally by a bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and one or more components described herein, such as, but not limited to, mobility optimization component 30 (FIG. 1). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 607. The software, when executed by the processor 604, causes the processing system 614 to perform the various functions described infra for any particular apparatus. The computer-readable medium 607 may also be used for storing data that is manipulated by the processor 604 when executing software. mobility optimization component 30 as described above may be implemented in whole or in part by processor 604, or by computer-readable medium 606, or by any combination of processor 604 and computer-readable medium 606.

Figure 8:
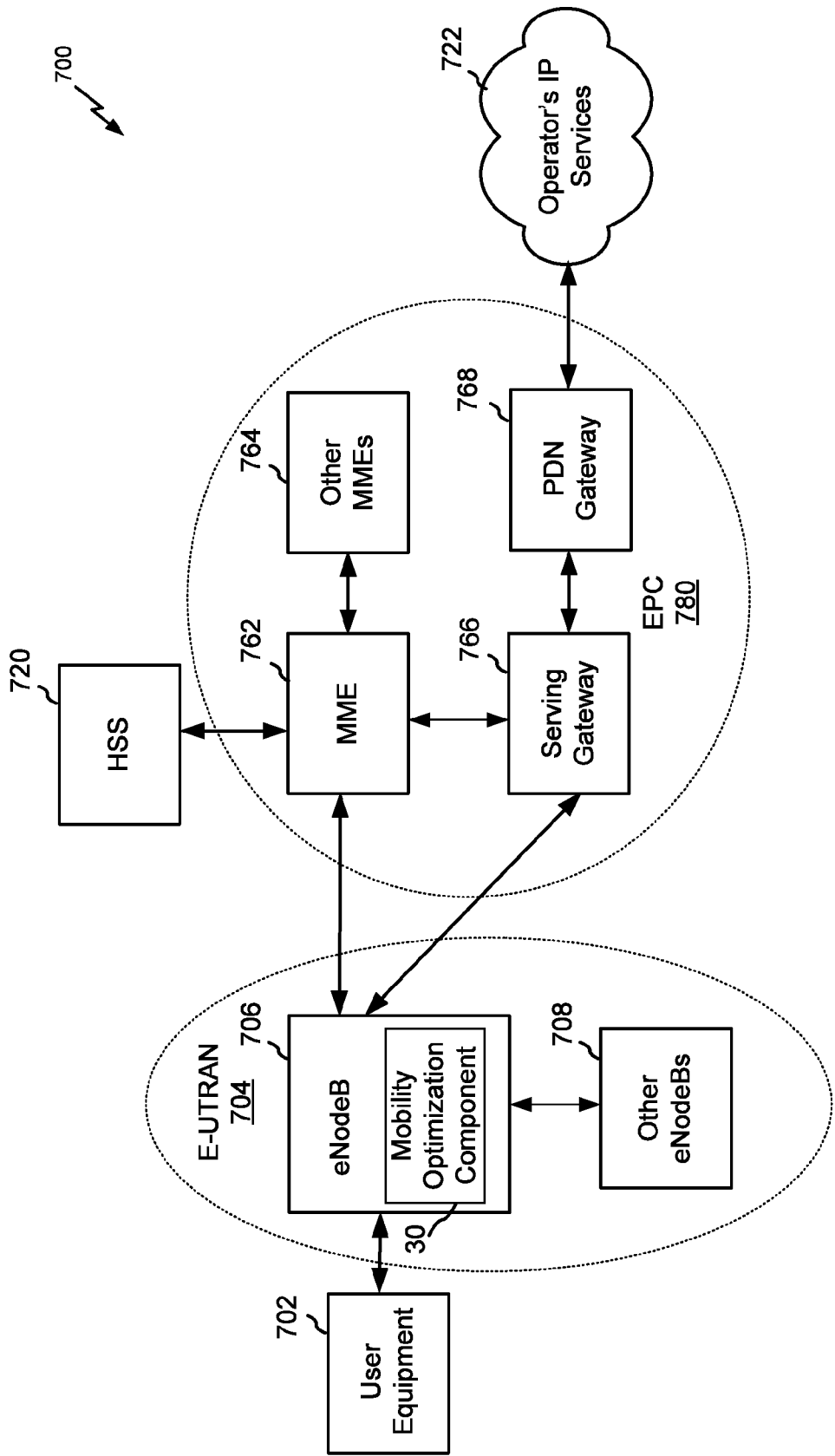
FIG. 8 is a block diagram conceptually illustrating an example of a telecommunications system.

FIG. 8 is a diagram illustrating a long term evolution (LTE) network architecture 700 employing various apparatuses of wireless communications system 10 (FIG. 1) and may include one or more eNodeBs 20 (FIG. 1) having an mobility optimization component 30, where the eNodeBs 20 may correspond to eNBs 706, 708, for example. The LTE network architecture 700 may be referred to as an Evolved Packet System (EPS) 700. EPS 700 may include one or more user equipment (UE) 702, an Evolved UMTS Terrestrial Radio Access Network (E-UTRAN) 704, an Evolved Packet Core (EPC) 780, a Home Subscriber Server (HSS) 720, and an Operator's IP Services 722. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 706 and other eNBs 708. The eNB 706 and 708 may each be an example of an eNodeB 20 (FIG. 1) including a mobility optimization component 30 for enabling concurrent transmission and radar detection using self-interference cancellation. The eNB 706 provides user and control plane protocol terminations toward the UE 702. The eNB 708 may be connected to the other eNBs 708 via an X2 interface (i.e., backhaul). The eNB 706 may also be referred to by those skilled in the art as a base station, a base transceiver station, a radio base station, a radio transceiver, a transceiver function, a basic service set (BSS), a small cell, an extended service set (ESS), or some other suitable terminology. The eNB 706 provides an access point to the EPC 780 for a UE 702. Examples of UEs 702 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 702 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 706 is connected by an S1 interface to the EPC 780. The EPC 780 includes a Mobility Management Entity (MME) 762, other MMEs 764, a Serving Gateway 766, and a Packet Data Network (PDN) Gateway 768. The MME 762 is the control node that processes the signaling between the UE 702 and the EPC 780. Generally, the MME 762 provides bearer and connection management. All user IP packets are transferred through the Serving Gateway 766, which itself is connected to the PDN Gateway 768. The PDN Gateway 768 provides UE IP address allocation as well as other functions. The PDN Gateway 768 is connected to the Operator's IP Services 722. The Operator's IP Services 722 includes the Internet, the Intranet, an IP Multimedia Subsystem (IMS), and a PS Streaming Service (PSS).

Figure 9:
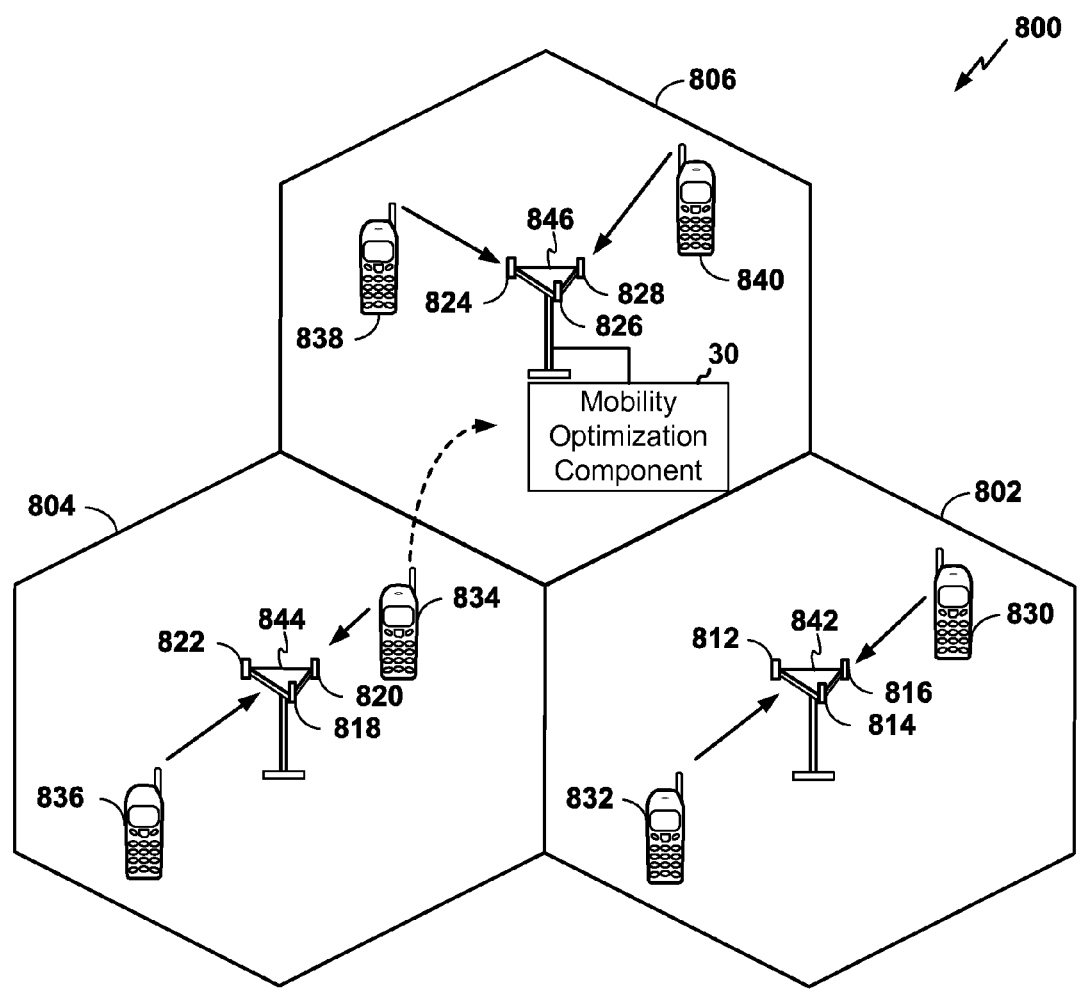
FIG. 9 is a conceptual diagram illustrating an example of an access network.

Referring to FIG. 9, an access network 800 in a E-UTRAN architecture is illustrated, and may include one or more base stations or eNodeBs 14, 20, 28 (FIG. 1) having the mobility optimization component 30. The multiple access wireless communication system includes multiple cellular regions (cells), including cells 802, 804, and 806, each of which may include one or more sectors and which may be provided by, for example, an eNodeB 14, 20, 28 of FIG. 1. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 819, 820, and 822 each correspond to a different sector. In cell 806, antenna groups 824, 826, and 828 each correspond to a different sector. The cells 802, 804 and 806 may include several wireless communication devices, e.g., UEs, for example, including UE 12 of FIG. 1, which may be in communication with one or more sectors of each cell 802, 804 or 806. In an aspect, each sector may be considered a different cell for MRO purposes. An eNodeB may, for example, receive an RLF indication that a wrong-cell handover occurred when the UE 834 is handed over to cell 806 instead of another sector of cell 804. In an aspect, UEs 830 and 832 may be in communication with eNodeB 842, UEs 834 and 836 may be in communication with eNodeB 844, and UEs 839 and 840 can be in communication with eNodeB 846. Here, each eNodeB 842, 844, 846 is configured to provide an access point for all the UEs 830, 832, 834, 836, 838, 840 in the respective cells 802, 804, and 806. Additionally, each eNodeB 842, 844, 846 and UEs 830, 832, 834, 836, 838, 840 may be UE 12 of FIG. 1 and may perform the methods outlined herein.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at EPC 780 (FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is currently monitoring. Further, each eNodeB 842, 844, 846 may detect handover failure events and adjust a transmit power of one or more antennas groups if an undesired coverage area is detected based on the handover failure events.

Further, the modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 10:
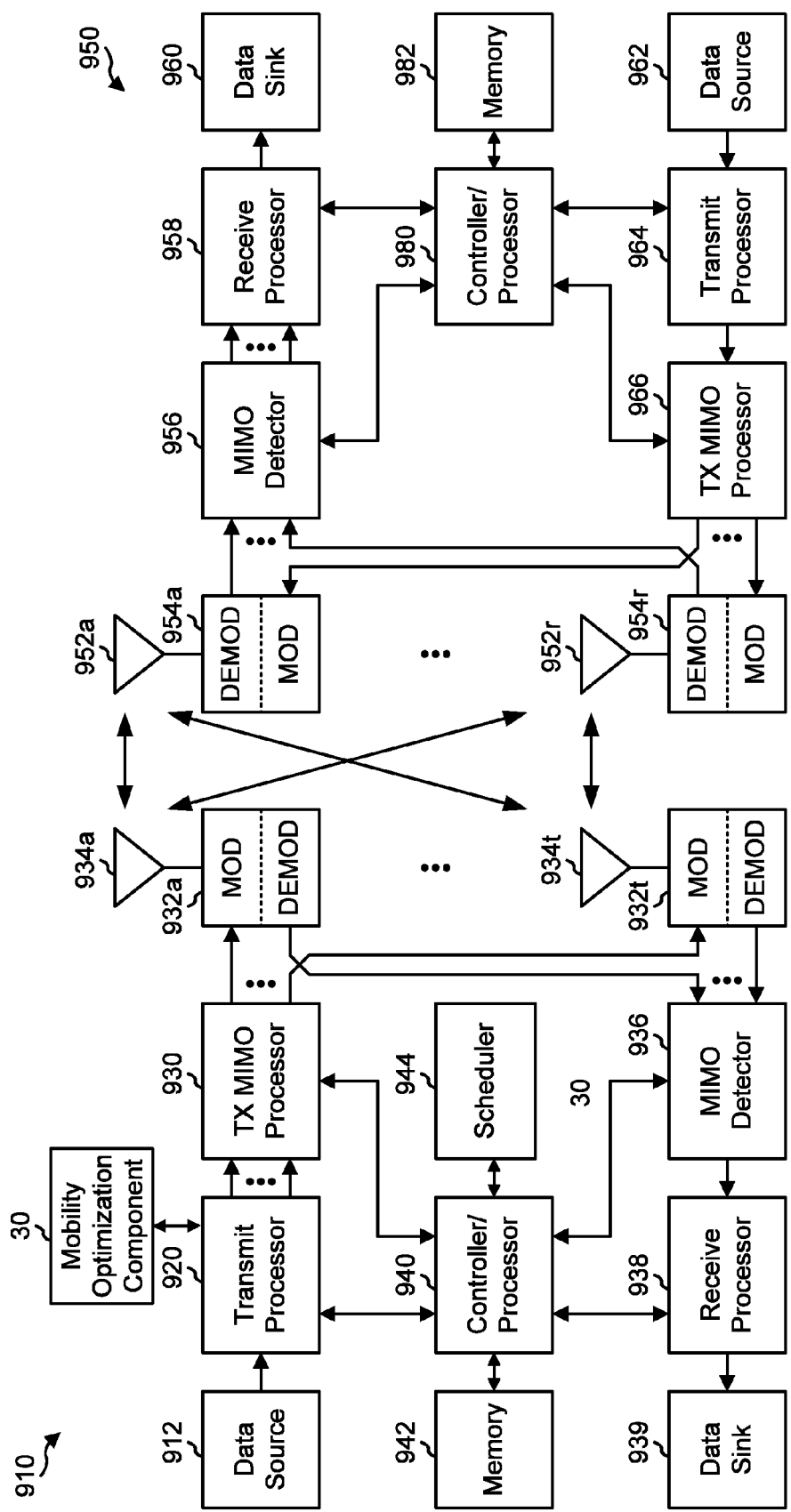
FIG. 10 is a block diagram conceptually illustrating an example of an eNodeB in communication with a UE in a telecommunications system.

FIG. 10 is a block diagram conceptually illustrating an exemplary eNodeB 910 and an exemplary UE 950 configured in accordance with an aspect of the present disclosure. For example, the base station/eNodeB 910 and the UE 950, as shown in FIG. 9, may be the eNodeB 20 having mobility optimization component 30 and the UE 12 in FIG. 1, respectively. The base station 910 may be equipped with antennas 934a-t, and the UE 950 may be equipped with antennas 952a-r, wherein t and r are integers greater than or equal to one.

At the base station 910, a base station transmit processor 920 may receive data from a base station data source 912 and control information from a base station controller/processor 940. The control information may be carried on the PBCH, PCFICH, PHICH, PDCCH, etc. The data may be carried on the PDSCH, etc. The base station transmit processor 920 may process (e.g., encode and symbol map) the data and control information to obtain data symbols and control symbols, respectively. The base station transmit processor 920 may also generate reference symbols, e.g., for the PSS, SSS, and cell-specific reference signal (RS). In an aspect, the mobility optimization component 30 may control a transmit power for the transmitted reference symbols including the cell-specific RS, which may be monitored for handover measurements. A base station transmit (TX) multiple-input multiple-output (MIMO) processor 930 may perform spatial processing (e.g., precoding) on the data symbols, the control symbols, and/or the reference symbols, if applicable, and may provide output symbol streams to the base station modulators/demodulators (MODs/DEMODs) 932a-t. Each base station modulator/demodulator 1432 may process a respective output symbol stream (e.g., for OFDM, etc.) to obtain an output sample stream. Each base station modulator/demodulator 932 may further process (e.g., convert to analog, amplify, filter, and upconvert) the output sample stream to obtain a downlink signal. Downlink signals from modulators/demodulators 932a-t may be transmitted via the antennas 934a-t, respectively. The transmission power of the downlink signals may be controlled by mobility optimization component 30.

At the UE 950, the UE antennas 952a-r may receive the downlink signals from the base station 910 and may provide received signals to the UE modulators/demodulators (MODs/DEMODs) 954a-r, respectively. Each UE modulator/demodulator 954 may condition (e.g., filter, amplify, downconvert, and digitize) a respective received signal to obtain input samples. Each UE modulator/demodulator 954 may further process the input samples (e.g., for OFDM, etc.) to obtain received symbols. A UE MIMO detector 956 may obtain received symbols from all the UE modulators/demodulators 954a-r, and perform MIMO detection on the received symbols if applicable, and provide detected symbols. A UE reception processor 958 may process (e.g., demodulate, deinterleave, and decode) the detected symbols, provide decoded data for the UE 950 to a UE data sink 960, and provide decoded control information to a UE controller/processor 980.

On the uplink, at the UE 950, a UE transmit processor 964 may receive and process data (e.g., for the PUSCH) from a UE data source 962 and control information (e.g., for the PUCCH) from the UE controller/processor 980. The UE transmit processor 964 may also generate reference symbols for a reference signal. The symbols from the UE transmit processor 964 may be precoded by a UE TX MIMO processor 966 if applicable, further processed by the UE modulator/demodulators 954a-r (e.g., for SC-FDM, etc.), and transmitted to the base station 910. At the base station 910, the uplink signals from the UE 950 may be received by the base station antennas 934, processed by the base station modulators/demodulators 932, detected by a base station MIMO detector 936 if applicable, and further processed by a base station reception processor 938 to obtain decoded data and control information sent by the UE 950. The base station reception processor 938 may provide the decoded data to a base station data sink 946 and the decoded control information to the base station controller/processor 940.

The base station controller/processor 940 and the UE controller/processor 980 may direct the operation at the base station 910 and the UE 950, respectively. The base station controller/processor 940 and/or other processors and modules at the base station 910 may perform or direct, e.g., the execution of various processes for the techniques described herein. The UE controller/processor 980 and/or other processors and modules at the UE 950 may also perform or direct, e.g., the execution of the functional blocks illustrated in FIG. 2 and/or other processes for the techniques described herein. The base station memory 942 and the UE memory 982 may store data and program codes for the base station 910 and the UE 950, respectively. A scheduler 944 may schedule UEs 950 for data transmission on the downlink and/or uplink. The mobility optimization component 30 may include or be implemented by the modulators/demodulators 932, receive processor 938, controller/processor 940, memory 942, transmit processor 920, and/or modulators/demodulators 932.

Several aspects of a telecommunications system have been presented with reference to an LTE system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmit power adaptation for wireless communications, comprising:
   detecting, by a target eNodeB, at least one incoming handover failure event for an incoming handover to a cell provided by the target eNodeB;
   determining, by the target eNodeB, a performance measurement for incoming handovers of the target eNodeB based on the at least one incoming handover failure event detected at the target eNodeB, wherein determining the performance measurement for incoming handovers of the target eNodeB comprises counting a number of incoming handover failure events at the target eNodeB;
   determining that the cell provides an undesired coverage area based on the performance measurement for incoming handovers of the target eNodeB, wherein determining that the cell provides an undesired coverage area based on the performance measurement for incoming handovers of the target eNodeB comprises determining that the performance measurement for incoming handovers of the target eNodeB exceeds a threshold; and
   adjusting, by the target eNodeB, in response to the determination that the cell is providing an undesired coverage area, a transmit power of the cell provided by the target eNodeB to alter the undesired coverage area.

2. The method of claim 1, wherein detecting the at least one incoming handover failure event comprises recording an incoming too-early handover event for the target eNodeB in response to sending an indication to another eNodeB that the incoming handover was a too-early handover, wherein adjusting the transmit power of the cell provided by the target eNodeB comprises decreasing the transmit power of the cell in response to a number of incoming too-early handover events exceeding the threshold.

3. The method of claim 1, wherein detecting the at least one incoming handover failure event comprises recording an incoming handover to wrong cell event for the target eNodeB in response to sending an indication to another eNodeB that the incoming handover to the target eNodeB was a handover to a wrong cell, wherein adjusting the transmit power of the cell provided by the target eNodeB comprises decreasing the transmit power of the cell in response to a number of incoming handover to the wrong cell events exceeding the threshold.

4. The method of claim 1, wherein detecting the at least one incoming handover failure event comprises determining that the target eNodeB was prepared for the incoming handover and the incoming handover was not completed.

5. The method of claim 1 wherein detecting the at least one incoming handover failure event comprises recording an incoming too-late handover event in response to sending a radio link failure indication to another eNodeB, wherein the radio link failure occurs due to an incoming too-late handover from the other eNodeB, and wherein adjusting the transmit power of the cell provided by the target eNodeB comprises increasing the transmit power of the cell in response to a number of incoming too-late handover events exceeding the threshold.

6. The method of claim 1, further comprising:
   delaying the adjusting of the transmit power for a time period sufficient for another eNodeB to change a configuration before adjusting the transmit power of the cell.

7. An apparatus for transmit power adaptation for wireless communications, comprising:
   means for detecting, by a target eNodeB, at least one incoming handover failure event for an incoming handover to a cell provided by the target eNodeB;
   means for determining, by the target eNodeB, a performance measurement for incoming handovers of the target eNodeB based on the at least one incoming handover failure event detected at the target eNodeB, wherein the means for determining the performance measurement for incoming handovers of the target eNodeB is configured to count a number of incoming handover failure events at the target eNodeB;
   means for determining that the cell provides an undesired coverage area based on the performance measurement for incoming handovers of the target eNodeB, wherein the means for determining that the cell provides an undesired coverage area based on the performance measurement for incoming handovers of the target eNodeB further comprises means for determining that the performance measurement for incoming handovers of the target eNodeB exceeds a threshold; and
   means for adjusting, by the target eNodeB, in response to the determination that the cell is providing an undesired coverage area, a transmit power of the cell provided by the target eNodeB to alter the undesired coverage area.

8. The apparatus of claim 7, wherein the means for detecting further comprises means for recording an incoming too-early handover event for the target eNodeB in response to the target eNodeB sending an indication to another eNodeB that the incoming handover was a too-early handover, wherein the means for adjusting the transmit power of the cell provided by the target eNodeB is configured to decrease the transmit power of the cell in response to a number of incoming too-early handover events exceeding the threshold.

9. The apparatus of claim 7, wherein the means for detecting further comprises means for recording an incoming handover to wrong cell event for the target eNodeB in response to the target eNodeB sending an indication to another eNodeB that the incoming handover to the target eNodeB was a handover to a wrong cell, wherein the means for adjusting the transmit power of the cell provided by the target eNodeB is configured to decrease the transmit power of the cell in response to a number of incoming handover to the wrong cell events exceeding the threshold.

10. The apparatus of claim 7, wherein the means for detecting further comprises means for detecting the at least one incoming handover failure event when the target eNodeB is prepared for the incoming handover and the incoming handover is not completed.

11. The apparatus of claim 7, wherein the means for detecting further comprises means for recording an incoming too-late handover event in response to the target eNodeB sending a radio link failure indication to another eNodeB, wherein the radio link failure occurs due to an incoming too-late handover from the other eNodeB, and wherein the means for adjusting the transmit power of the cell provided by the target eNodeB is configured to increase the transmit power of the cell in response to a number of incoming too-late handover events exceeding the threshold.

12. The apparatus of claim 7, further comprising means for delaying the adjusting of the transmit power for a time period sufficient for another eNodeB to change a configuration before adjusting the transmit power of the cell.

13. An apparatus for transmit power adaptation for wireless communications, comprising:
a handover event detecting component configured to detect at least one incoming handover failure event, at a target eNodeB, for an incoming handover to a cell provided by the target eNodeB;
a performance measurement component configured to determine, at the target eNodeB, a performance measurement for incoming handovers of the target eNodeB based on the at least one incoming handover failure event detected at the target eNodeB, wherein the performance measurement component is configured to count a number of incoming handover failure events at the target eNodeB;
a performance analyzer configured to determine that the cell provides an undesired coverage area based on the performance measurement for incoming handovers of the target eNodeB, wherein the performance analyzer is configured to determine that the cell provides an undesired coverage area based on the performance measurement for incoming handovers of the target eNodeB in response to determining that the performance measurement for incoming handovers of the target eNodeB exceeds a threshold; and
a transmit controller at the target eNodeB configured to adjust, in response to the determination that the cell is providing an undesired coverage area, a transmit power of the cell provided by the target eNodeB to alter the undesired coverage area.

14. The apparatus of claim 13, further comprising an X2 interface component configured to communicate with another eNodeB.

15. The apparatus of claim 14, wherein the handover event detecting component is configured to when the X2 interface component sends an indication to the other eNodeB that the incoming handover was a too-early handover.

16. The apparatus of claim 14, wherein the handover event detecting component is configured to record an incoming too-early handover event for the target eNodeB in response to the X2 interface component sending an indication to the other eNodeB that the incoming handover to the target eNodeB was a handover to a wrong cell.

17. The apparatus of claim 14, wherein the handover event detecting component is configured to detect the at least one incoming handover failure event when the X2 interface component receives a handover preparation message from the other eNodeB and the incoming handover is not completed.

18. The apparatus of claim 14, wherein the handover event detecting component is configured to record an incoming too-late handover event in response to the X2 interface component sending a radio link failure indication to another eNodeB, wherein the radio link failure occurs due to a too-late handover from the another eNodeB, and wherein the transmit controller is configured to increase the transmit power of the cell in response to a number of incoming too-late handover events exceeding the threshold.

19. The apparatus of claim 13, further comprising a timer configured to delay the adjusting of the transmit power for a time period sufficient for another eNodeB to change a configuration before adjusting the transmit power of the cell.

20. A non-transitory computer-readable medium storing computer executable code, comprising:
code for detecting, by a target eNodeB, at least one incoming handover failure event for an incoming handover to a cell provided by the target eNodeB;
code for determining, by the target eNodeB, a performance measurement for incoming handovers of the target eNodeB based on the at least one incoming handover failure event detected at the target eNodeB, wherein the code for determining the performance measurement for incoming handovers of the target eNodeB comprises code for counting a number of incoming handover failure events at the target eNodeB;
code for determining that the cell provides an undesired coverage area based on the performance measurement for incoming handovers the target eNodeB, wherein the code for determining that the cell provides an undesired coverage area based on the performance measurement for incoming handovers of the target eNodeB comprises code for determining that the performance measurement for incoming handovers of the target eNodeB exceeds a threshold; and
code for adjusting, by the target eNodeB, in response to the determination that the cell is providing an undesired coverage area, a transmit power of the cell provided by the target eNodeB to alter the undesired coverage area.

21. The non-transitory computer-readable medium of claim 20, wherein the code for detecting the at least one incoming handover failure event comprises code for recording an incoming too-early handover event for the target eNodeB in response to sending an indication to another eNodeB that the incoming handover occurred too-early, wherein the code for adjusting the transmit power of the cell provided by the target eNodeB comprises code for decreasing the transmit power of the cell in response to a number of incoming too-early handover events exceeding the threshold.

22. The non-transitory computer-readable medium of claim 20, wherein the code for detecting the at least one incoming handover failure event comprises code for recording an incoming handover to wrong cell event for the target eNodeB in response to sending an indication to another eNodeB that the incoming handover to the target eNodeB was a handover to a wrong cell, wherein the code for adjusting the transmit power of the cell provided by the target eNodeB comprises code for decreasing the transmit power of the cell in response to a number of incoming handover to the wrong cell events exceeding the threshold.

23. The non-transitory computer-readable medium of claim 20, wherein detecting the at least one incoming handover failure event comprises determining that the target eNodeB was prepared for the incoming handover and the incoming handover was not completed.

24. The non-transitory computer-readable medium of claim 20, wherein the code for detecting the at least one incoming handover failure event comprises code for recording an incoming too-late handover event in response to sending a radio link failure indication to another eNodeB, wherein the radio link failure occurs due to an incoming too-late handover from the other eNodeB, and wherein the code for adjusting the transmit power of the cell provided by the target eNodeB comprises code for increasing the transmit power of the cell in response to a number of incoming too-late handover events exceeding the threshold.

\* \* \* \* \*